United States Patent
Jellison

[15] 3,670,618
[45] June 20, 1972

[54] COMPOSITE WASHER
[72] Inventor: Paul J. Jellison, Pittsburgh, Pa.
[73] Assignee: Textron, Inc., Providence, R.I.
[22] Filed: Oct. 2, 1970
[21] Appl. No.: 77,610

[52] U.S. Cl. .................................85/1 JP, 85/50, 277/166, 277/233
[51] Int. Cl. .....................................F16b 35/00, F16b 43/00
[58] Field of Search..........................85/1 JP, 1 R, 50 R, 9 R; 151/38, 7; 277/233, 234, 227, 228, 166, 189, 178

[56] References Cited

UNITED STATES PATENTS

| | | | |
|---|---|---|---|
| 2,859,055 | 11/1958 | Hupp | 277/233 X |
| 2,982,573 | 5/1961 | McKee | 85/1 JP X |
| 3,220,453 | 11/1965 | Greeno | 151/7 |
| 3,160,054 | 12/1964 | Cohen et al. | 85/1 JP |
| 2,761,347 | 9/1956 | McKee | 85/1 JP |
| 3,452,636 | 7/1969 | Cohen et al. | 85/1 JP |

*Primary Examiner*—Ramon S. Britts
*Attorney*—Webb, Burden, Robinson & Webb

[57] ABSTRACT

A composite washer having a dome-shaped metal member and a resilient member such as neoprene bonded thereto. The resilient member comprises two components, the first of which is bonded to the metal member along its bottom surface at the high portion of the dome and substantially adjacent the central opening, and the second component is positioned in partially overlapping relationship with the first component and is also bonded to the metal member along the bottom surface and radially removed from the washer central opening. The metal member is shaped to restrict the resilient member from moving radially outward and to urge a radially inward movement.

9 Claims, 5 Drawing Figures

PATENTED JUN 20 1972 3,670,618

INVENTOR.
Paul J. Jellison
BY
Webb Burden Robinson & Webb
HIS ATTORNEYS

COMPOSITE WASHER

This invention relates to sealing washers and, more particularly, to a dome-shaped composite washer having an overlapping two component resilient member.

A large number of sealing washers are available in today's market place. Many of these sealing washers are of the composite type in that they include a metal member and a resilient member with the latter being of a material such as neoprene. These various sealing washers are available in a large number of shapes and functional designs, but the need for improved sealing washers persists, and it is in this area of improvement that I have directed my invention.

My composite washer, in general, increases resistance to crushing or flattening while at the same time increases the sealing ability. Further, because of the particular shape, my composite washer permits conformity to more irregular shapes of workpieces than presently known sealing washers. By employing two plys of thickness of the resilient member at the high dome portion of the washer, I am able to get this increased seal. By providing a different contour on the upper surface of the dome-shaped washer than the lower surface, my washer accommodates heavy loading without concern for upturned ends or defaced finishes on the workpiece. In addition, because of the contour of the metal member, the resilient member is urged inward toward the shank of a fastener for improved sealing. And still further, by adopting annular grooves in the resilient layer, I have further increased sealing resiliency resulting from increased loading and more permissible radial flexing during axial compression.

My invention is a composite washer having a dome-shaped metal member with a central opening therethrough and a resilient member. The resilient member, which is a material such as neoprene, is in two components which overlap at the high portion of the dome of the metal member. The resilient member is bonded to the metal member along both components of the resilient member. An annular groove may be employed in the bottom surface of the resilient component radially removed from the central opening. An additional annular peripheral lip can be added to the metal member to aid in the control of the movement of the resilient member upon tightening.

In the accompanying drawings, I have shown the presently preferred embodiments of my invention in which.

My composite washer includes a metal member generally designated 10 and a resilient member, generally designated 11. The resilient member 11 can be a variety of different materials, but neoprene has been found very effective as a sealant.

Figure 1:
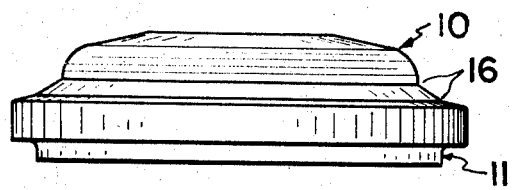
FIG. 1 is an elevation of my composite washer.

The metal member 10 of the composite washer is substantially dome-shaped, see FIG. 1, and has a central opening 20 therethrough. The upper surface 14 of the metal member 10 is double bent outwardly between the high portion of the dome and the washer periphery, as shown at 16 in FIGS. 1 and 2, to permit loading and the avoidance of upturned edges.

Resilient member 11 comprises two components. The first component 12 is bonded to and along bottom surface 15 of the metal member 10 and is positioned in the area adjacent the central opening 20. For improved sealing and for retention on a fastener, component 12 actually radially extends slightly into opening 20. The second component 13 is bonded to and along the bottom surface 17 of metal member 10 and is positioned radially outward, i.e. spaced from central opening 20. As will be described hereinafter, component 13 terminates inward from the outer periphery of metal member 10. Component 13 overlaps component 12 in the vicinity of the high dome portion of member 10.

Bottom surfaces 17 and 15, in combination, define the inner surface of the metal member 10. Both surfaces 17 and 15 are inclined upward to the central opening 20. At the same time, resilient component 13 is likewise upwardly inclined; and as described, component 13 terminates inward from the peripheral edge of member 10 and surface 17. Therefore, upon tightening a fastener positioned in the opening 20 into a workpiece, the resilient member 11 is compressed and is deformed inwardly toward the central opening 20. Generally, upon complete tightening, the resilient member 11 will completely fill the dome area of the washer, the area adjacent the shank in the vicinity of central opening 20 and the area about the threads of the fastener. Because resilient member 11 terminates inward of the metal member's outer periphery and because of the inward deformation of resilient member 11, the outer periphery of metal member 10 approaches and contacts the workpiece thereby preventing any of the resilient component 13 from extending radially outward beyond the periphery of metal member 10.

Figure 2:
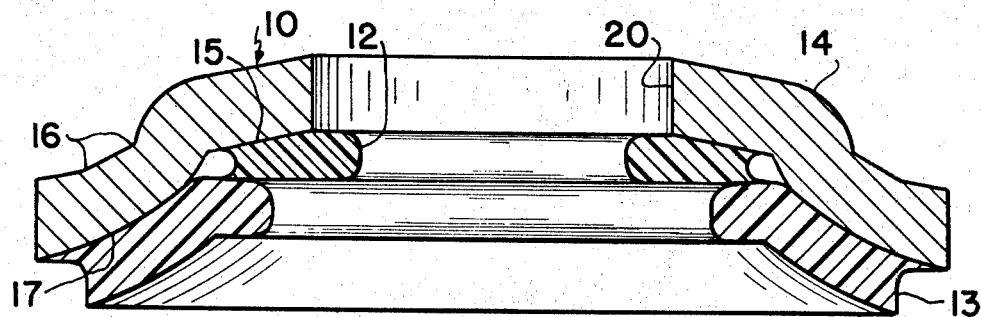
FIG. 2 is a full section of my composite washer.

It can be seen in FIG. 2 that resilient components 13 and 12 actually represent two plys or thicknesses of the resilient member at the high dome portion of the washer. This, along with the inward urging of the resilient component 13 upon tightening, and the extended portion of the resilient component 12 into opening 20, substantially increases sealing in the areas thereabout, including about the shank of a fastener which, of course, represent the critical areas for sealing.

It can also be seen that the smooth contour of bottom surfaces 15 and 17 and second component 13, as compared to the double bent upper surface 14 of metal member 10, permits rapid adaptability to various contoured workpieces yet, at the same time, providing the aforementioned resistance to edge turnup upon increased loading.

Figure 3:
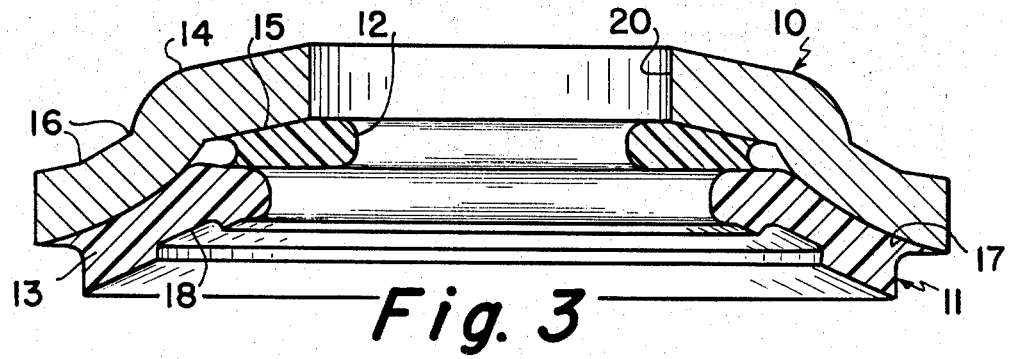
FIG. 3 is a full section of my composite washer having an annular groove.

To increase the sealing resiliency, both in terms of receiving increased loading and increased radial flexing during axial compression, an annular groove 18 can be positioned within second component 13 of resilient member 11, see FIG. 3. This groove 18 is positioned about midway between the ends of component 13.

Figure 4:
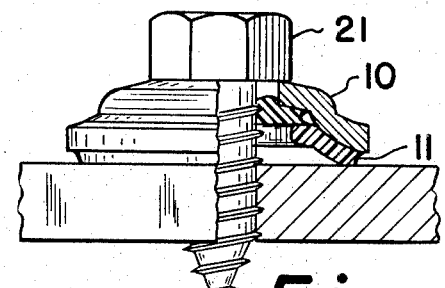
FIG. 4 is a partial section showing my composite washer in combination with a fastener.

As stated hereinbefore, the resilient member 12 extends radially inward into the central opening 20, not only to improve sealing along the shank of a fastener, but also to retain the fastener. In FIG. 4, I have shown such a fastener-washer combination. The fastener 21 is positioned in the central opening 20 of my composite washer. The resilient component 12 which extends radially inward beyond the surface which defines opening 20 in metal member 10 grips the fastener 21. Therefore, the composite washer can be easily preassembled with different types of fasteners and distributed in that manner.

Figure 5:
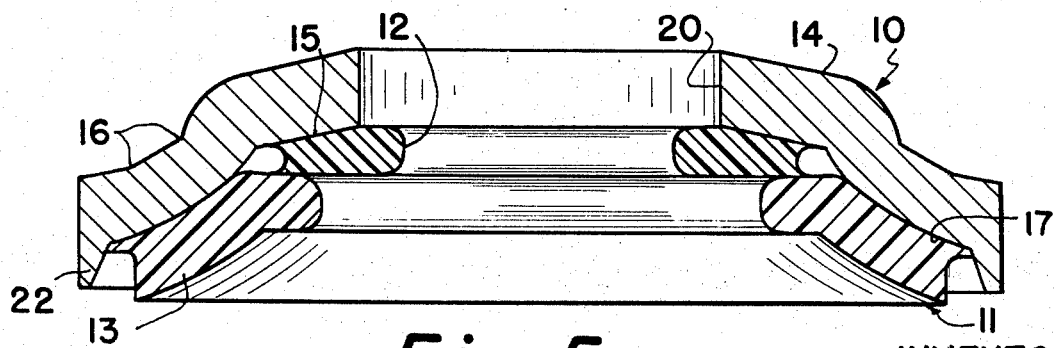
FIG. 5 is a full section of my composite washer having a downwardly extending peripheral lip.

My composite washer may further contain a downwardly depending peripheral lip portion 22 as a part of the metal member 10, see FIG. 5. This lip portion 22 overhangs the recessed resilient component 13 so that upon tightening, further means are provided to prevent the resilient member 13 from deforming outwardly beyond the periphery of metal member 10.

While I have shown and described preferred embodiments of my invention, it may be otherwise embodied within the scope of the appended claims.

I claim

1. A composite washer comprising a dome-shaped metal member and a resilient member, said dome-shaped metal member having top and bottom surfaces and a central opening therethrough, said resilient member having two components, the first component being bonded to the metal member along the bottom surface thereof and extending from substantially adjacent the central opening to a point substantially inward of the outer periphery of the metal member, and the second component being in partially overlapping relationship with said first component, said second component also being bonded to the metal member along the bottom surface thereof and being positioned radially removed outward from the central opening and terminating short of the outer periphery of the metal member, said overlap being in a high portion of the dome.

2. The composite washer of claim 1 wherein the first component extends radially inward into the central opening.

3. The composite washer of claim 1 wherein the second component has an annular groove in its bottom surface.

4. The composite washer of claim 1 wherein the upper surface of the metal member is double bent in the area between the high portion of the dome and the outer periphery.

5. The composite washer of claim 1 wherein the inner surface of the metal member is inclined upwardly toward the central opening so that upon tightening of a fastener positioned within the central opening into a workpiece, the resilient member is urged toward the central opening and away from the outer periphery of the metal member.

6. The composite washer of claim 1 wherein the metal member terminates along its periphery in a downwardly extending annular lip so that, upon compression, the resilient member is prevented from deforming radially outward beyond the metal member.

7. The composite washer of claim 3 wherein the annular groove is positioned substantially midway between the ends of the second component.

8. In combination, a fastener and a washer, said washer including a dome-shaped metal member and a two component resilient member, said dome-shaped metal member having top and bottom surfaces and a central opening therethrough, the first component being bonded to the metal member along the bottom surface thereof and extending from radially within the central opening to a point substantially inward of the outer periphery of the metal member, and the second component being in partially overlapping relationship in the area of a high portion of the dome with said first component, said second component also being bonded to the metal member along the bottom surface thereof and being positioned radially removed outward from the central opening and terminating short of the outer periphery of the metal member, the fastener extending through the central opening and the washer being retained on the fastener by means of the portion of the first component extending radially into the central opening.

9. The combination of claim 8 characterized by the resilient member completely filling the dome portion and the area adjacent the fastener in the central opening, including the area adjacent threads of the fastener when the combination is in a tightened position with respect to a workpiece.

* * * * *